Patented July 24, 1934

UNITED STATES PATENT OFFICE 1,967,955

COATING COMPOSITION

Walter E. Lawson, Wilmington, Del., assignor to E. I du Pont de Nemours & Company, Wilmington, Del., a corporation of Delaware No Drawing. Original application July 27, 1928, Serial No. 295,837. Divided and this application September 5, 1930, Serial No. 479,933

12 Claims. (Cl. 134—26)

This invention relates to the art of synthetic resins, and more particularly to synthetic resins containing ether groups and compositions made therewith. This application is a division of the copending application filed July 27, 1928, Serial No. 295,837, Patent No. 1,909,197, May 16, 1933.

On account of the cost and relative scarcity of natural resins, many attempts have been made to produce synthetic resins, but these attempts have often been unsuccessful because the resulting resins lacked certain definite properties found to be necessary for the purposes for which they are intended, such as coating compositions and plastics. Among these properties may be mentioned softness or non-brittleness and compatibility with other materials.

It is an object of this invention to produce synthetic resins which are not brittle.

It is another object of this invention to produce synthetic resins which are compatible with cellulose derivatives.

It is also an object of this invention to produce compositions of matter containing these resins.

With the above and other objects in view, which will be apparent as the description proceeds, I have set forth below several embodiments of my invention by way of illustration and not as a limitation.

The resin-like materials used in the following compositions are prepared by heating substantially 1 mol of a dibasic acid or its anhydride, such as phthalic anhydride, with 1 mol of a monoalkyl ether of glycerin, such as monoethylin or monomethylin, at 175–250° C. for 3–14 hours.

In the process of making these resins the heating may be varied over the range indicated but the temperature used is that which will insure virtually complete esterification of all the acid and alcohol groups, without being sufficiently high to cause decomposition of either the reagents or the reaction products.

If desired the acid number of the resin may be reduced by blowing an inert gas through the heated mass to remove any excess phthalic anhydride or other acid material.

These resins are somewhat similar to the glyptal resins made from glycerol and phthalic anhydride, but differ from glyptal resins in containing ether groups, and have therefore, a different structure and possess different properties. On saponification with alkali they yield the salt of a dibasic acid and an ether of an aliphatic polyhydroxy compound containing at least two free hydroxyl groups.

These resins are of value as constituents of coating compositions and varnishes, and may be used in molding compositions of various kinds, as well as in films and sheets, and as adhesives in the manufacture of safety glass. They are particularly useful as protective finishes when combined with cellulose derivatives, including cellulose nitrate and ethyl cellulose.

Illustrative examples of compositions formed by using these resin-like materials are as follows:

Example 1

| | Parts by weight |
|---|---|
| Cellulose nitrate | 15 |
| Monoethylin phthalate | 15 |
| Dibutyl phthalate | 4.5 |
| Solvent (85% ethyl acetate, 15% butyl acetate) | 100 |

Example 2

| | Parts by weight |
|---|---|
| Cellulose nitrate | 15 |
| Monoethylin succinate | 15 |
| Dibutyl phthalate | 4.5 |
| Solvent (85% ethyl acetate, 15% butyl acetate) | 100 |

Example 3

| | Parts by weight |
|---|---|
| Ethyl cellulose | 8 |
| Monomethylin phthalate | 2 |
| Castor oil | 4 |
| Solvent (benzene) | 100 |

Although the examples set forth above are limited to the use of resin-like materials formed by using phthalic and succinic acids, it will be understood that other organic acids containing two or more carboxyl groups may be substituted for phthalic or succinic acid for reaction with the monoethylin or monomethylin, or any desired mixtures of these acids may be used for this purpose.

It will also be apparent that in place of monoethylin or monomethylin I can use ethers of other polyhydroxy compounds, such as other monoalkyl ethers of glycerin, monoaryl ethers of glycerin, or mono- or di-alkyl or aryl ethers of pentaerythrite, mannitol or sorbitol.

Furthermore, if desired, compositions of the type set forth herein may also include modifiers of the types generally used in the preparation of glyptal resins.

When the resin-like materials are formed from acids containing more than two carboxyl groups and polyhydroxy compounds containing other than two free hydroxyl groups, the relative quantities of these materials employed will usually be varied so that equivalent proportions of the two groups will be present.

However, in making the resin-like materials disclosed herein it is sometimes desirable to vary the proportions of the ingredients and use an excess of one or the other. In such cases, if it is desired to remove the excess, this may be done in any known way, as by blowing an inert gas through the heated mass.

Cellulose acetate coating compositions containing the resin-like materials disclosed herein are not claimed specifically in this application but are disclosed and claimed in a co-pending application by Frederick C. Hahn, filed July 27, 1928, Pat. No. 1,812,335.

As many apparently widely different embodiments of this invention may be made without departing from the spirit thereof, it is to be understood that I do not limit myself to the foregoing examples, proportions or description except as indicated in the following patent claims.

I claim:

1. A coating composition containing a cellulose derivative, a resinous polybasic acid ester of monoethylin, a softener and a solvent.

2. A coating composition containing a cellulose derivative, a phthalate of a monoalkyl ether of glycerin, a softener and a solvent.

3. A coating composition containing a cellulose derivative, monoethylin phthalate, a softener and a solvent.

4. A coating composition containing cellulose nitrate, a resinous polybasic acid ester of a monoalkyl ether of glycerin, a softener and a solvent.

5. A coating composition containing cellulose nitrate, a phthalate of a monoalkyl ether of glycerin, a softener and a solvent.

6. A coating composition containing cellulose nitrate, monoethylin phthalate, a softener and a solvent.

7. A coating composition containing 15 parts by weight of cellulose nitrate, 15 parts by weight of monoethylin phthalate, 4.5 parts by weight of a softener, and 100 parts by weight of a solvent.

8. A coating composition comprising a cellulose derivative, a solvent, and a resinous polybasic acid ester of a hydrocarbon radical ether of a polyhydric alcohol containing at least three hydroxyl groups, said ether having at least two free hydroxyl groups.

9. A coating composition comprising a cellulose derivative, a solvent, and a resinous polybasic acid ester of an alkyl ether of a polyhydric alcohol containing at least three hydroxyl groups, said ether having at least two free hydroxyl groups.

10. A coating composition comprising a cellulose derivative, a softener, a solvent, and a resinous polybasic acid ester of a monoalkyl ether of a polyhydric alcohol having at least three hydroxyl groups.

11. A coating composition comprising a cellulose derivative, a softener, a solvent, and a resinous polybasic acid ester of an aryl ether of a polyhydric alcohol having at least three hydroxyl groups.

12. A coating composition comprising a cellulose derivative, a solvent, and a resinous polybasic acid ester of a mono ether of glycerin with an organic compound containing one hydroxyl group.

WALTER E. LAWSON.